United States Patent
Shibata

Patent Number: 5,105,673
Date of Patent: Apr. 21, 1992

[54] SETTING-UP APPARATUS OF OVER-CENTERING COIL SPRING

[75] Inventor: Thoru Shibata, Utsunomiya, Japan

[73] Assignee: Mitsui Kinzoku Kogyo Kabushiki Kaisha, Tokyo, Japan

[21] Appl. No.: 718,707

[22] Filed: Jun. 21, 1991

[30] Foreign Application Priority Data

Jun. 22, 1990 [JP] Japan ................ 2-165382

[51] Int. Cl.⁵ .............................................. F16F 1/12
[52] U.S. Cl. .................... 74/97.1; 267/155; 267/173
[58] Field of Search ............ 74/97.1; 267/155, 173, 267/179

[56] References Cited

U.S. PATENT DOCUMENTS 2,670,415  2/1954  Anderson et al. ................ 74/97.1

FOREIGN PATENT DOCUMENTS 63-769929  4/1988  Japan .................... 267/155
63-158331  7/1988  Japan .................... 267/155

Primary Examiner—Leslie A. Braun
Assistant Examiner—Ryan W. Massey
Attorney, Agent, or Firm—Browdy and Neimark

[57] ABSTRACT

A setting-up apparatus of over-centering coil springs comprises a base plate having a first opening, an oscillating member having a second opening and journalled on the base plate so as to be displaced between a first position and a second position, a coil spring provided with a first leg engaged with said first opening and a second leg engaged with said second opening in order to hold said oscillating member at either one of said first position and the second position separated by a centering dead point of the oscillating member, and a communication opening communicated with said first opening. The communication opening is adapted to receive the first leg of the coil spring without compression of the coil spring when the second leg is engaged with the second opening which doesn't have the communication opening.

1 Claim, 4 Drawing Sheets

SETTING-UP APPARATUS OF OVER-CENTERING COIL SPRING

FIELD OF THE INVENTION

The present invention relates to a setting-up apparatus of an over-centering coil spring which is used to hold an oscillating member such as a lever adapted to swing or be displaced between a side position and another side position of a shaft placed at one overcentering position of them. One example of the oscillating members is a locking bar or lever installed in a vehicle locking device, which lever being adapted to change its holding position from its locked position and unlocked one.

BACKGROUND OF THE INVENTION

FIG. 7 depicts an operative relation between a well-known rocking member E and an over-centering coil spring C. As shown, the conventional rocking member E is journalled oscillatably on a base plate H through a shaft G. An end portion A of the coil spring C is engaged with an opening D formed in a front portion of the rocking member E. Another end portion B is engaged with an opening F formed in a base plate H. The base plate H has a pair of engagement pieces J and K, respectively formed in and placed at the symmetrical positions of a straight line I connecting the centers of the shaft G and the opening F, in order to restrict or control the range of movement of the rocking member E.

Due to such construction of the rocking member E and the base plate H, the rocking member E can be held at its one position whereat the member E abutting against the engagement piece J or its other position whereat the member E abutting against the other engagement piece K.

According to the conventional mechanism, after one leg or end portion A of the coil spring is made to be engaged with the opening D, the other end portion B of the coil spring C must be made to be engaged with the opening F, which is often small, with the coil spring C being compressed. It is apparent that such compressing operation of the coil spring is very difficult. The construction of the conventional setting-up apparatus for over-centering coil springs is explicitly simple, however if it is operated to set up the coil spring by a non-professional person, the coil spring C will be sprung off easily in a moment. It is more difficult when the coil spring C is to be set up in a complicated mechanism apparatus.

SUMMARY OF THE INVENTION

Accordingly, it is the purpose of the present invention to provide a setting-up apparatus of over-centering coil springs, which is adapted to set up over-centering coil springs in a mechanism very easily.

EMBODIMENTS

Figure 1:
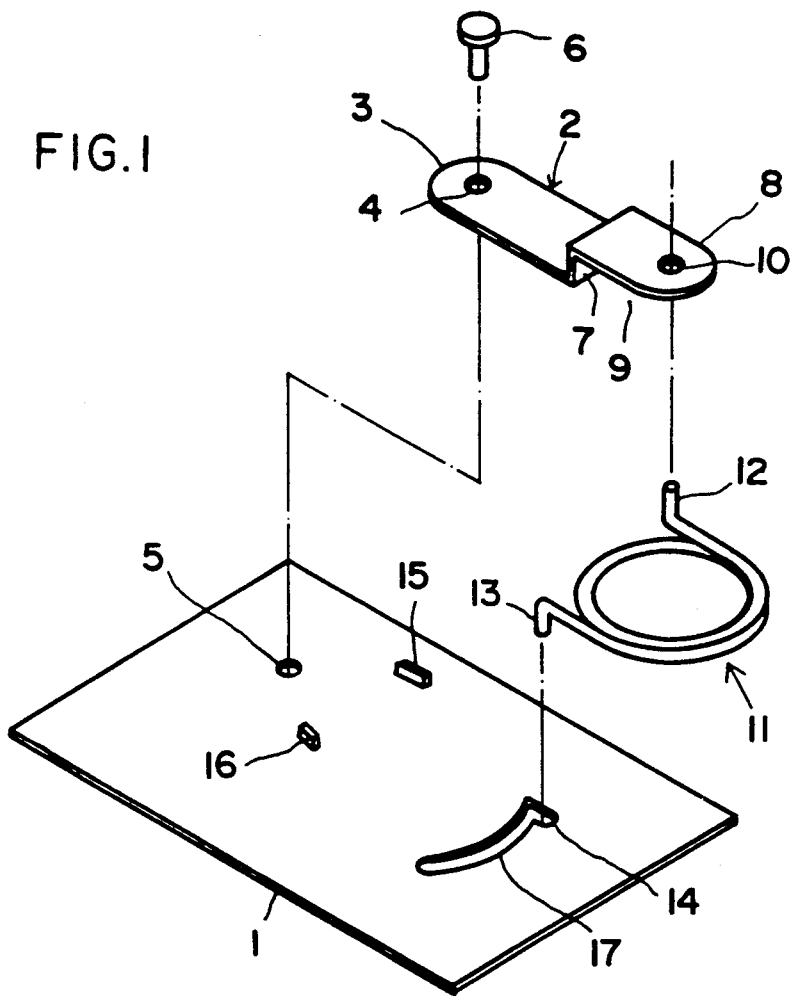
FIG. 1 shows, in a manner of explosion, a perspective view of one embodiment of whole structure of the setting-up apparatus of over-centering coil springs according to the present invention.

One of the embodiments of the setting-up apparatus of coil springs will be described with reference to the accompanying drawings. The setting-up apparatus according to the present invention consists of in general a base plate 1, which has for convenience a flat plate shape, and a lever-like oscillating member 2. The oscillating member 2 has a base portion 3 provided with a through or communication opening 4. The base plate 1 has a through or communication opening 5 formed therein. As shown, a shaft 6 is inserted into these communication openings 4 and 5 in order to rotatably journal the oscillating member 2 in the base plate 1.

One concrete embodiment of the oscillating member 2 is a lock lever used to a vehicle lock device and changes its position from a lock position to unlock position. In such case, an example of the base plate 1 is a body of the lock device having a lock lever attached thereto.

The oscillating member 2 has a stepped portion 7 placed at a mid of the axial direction, thereby a space 9 is formed below the front end portion 8 of the oscillating member 2 and above the base plate 1. The front end portion 8 of the oscillating member 2 has an engagement hole 10 formed therein.

It is apparent that the coil spring 11 has a winding portion, a upward-bent leg or end portion 12, and a downward-bent leg or end portion 13. The leg 12 is adapted to be inserted upwardly into the engagement hole 10.

At the position on the base plate 1 separated from the through opening 5, there is a through or communication opening 14 to which a downward-bent leg 13 of the coil spring 11 is inserted. The base plate 1 has a pair of projections 15 and 16 formed thereon for restricting the oscillating range of the oscillating member 2. These projections 15 and 16 are placed at both sides of the straight line 18 connecting the communication opening 5 and the communication opening 14.

Figure 2:
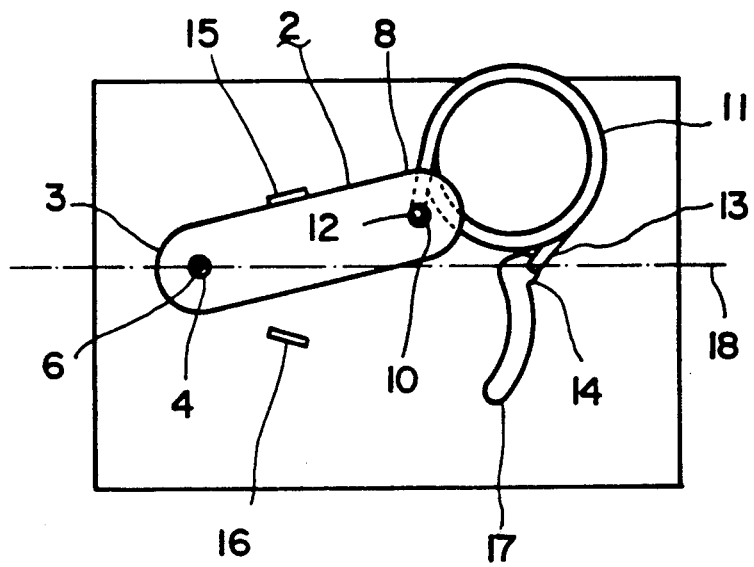
FIG. 2 shows a plan view of the oscillating member when it is urged or pushed along a direction.
Figure 3:
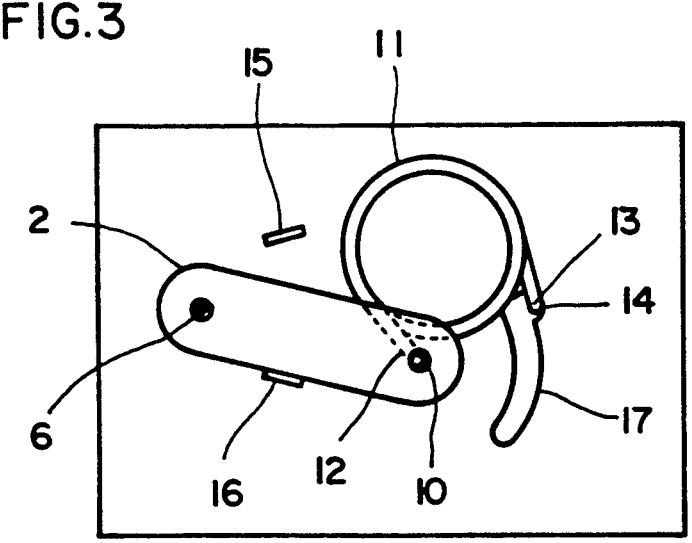
FIG. 3 is another plan view of the member when pushed along another direction.

The coil spring 11 is mostly compressed when the leg 12 coincides with the straight line 18. When the leg 12 coincides with the straight line 18, it is called a dead point of the coil spring 11. Consequently, the oscillating member 2 is held at either position of one position in which the oscillating member 2 abuts against the projection 15 (see FIG. 2) and other one in which the oscillating member 2 abuts against the other projection 16 (see FIG. 3) and pressed to one of respective positions centering the dead point of the coil spring.

The construction described above of the setting-up apparatus is identical with the conventional one, so that the largest characteristic of the present invention resides in that the opening F (corresponding to the communication opening 14 of the present invention) which has been shaped in merely a round has a communication opening 17 of a special structure, which is connected to the former opening F in order to make the setting-up operation of the coil spring 11 very easy.

There are many variations of the position and size of the communication opening 17 and the fundamental conditions of the opening 17 are shown below.

(1) When one leg 12 of the coil spring 11 is engaged with the engagement hole 10 of the oscillating member 2, it is possible to make another leg 13 to be engaged with the communication opening 17 without compressing the coil spring 11.

(2) The through opening 17 is communicated with the opening 14.

FIGS. 1-4, respectively show a general example of the communication opening satisfying the two conditions above by a communication opening 17 which is formed in an arc shape centering the communication opening 5.

Figure 5:
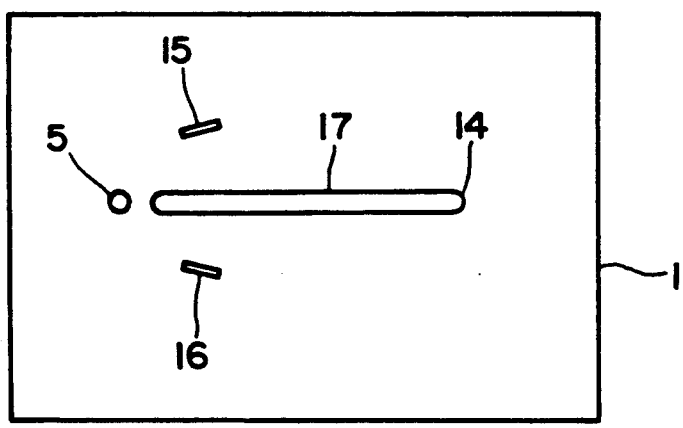
FIG. 5 shows the second embodiment of the setting-up apparatus provided with different communication opening.

FIG. 5 shows a base plate 1 provided with a communication opening 17 extending straightly from the through opening 14 to the communication opening 5. The base plate 1 is suitable to use when little space is obtained or left in its upper portion and its lower portion on the drawing or when the base plate 1 is slim extending along its horizontal direction.

Figure 6:
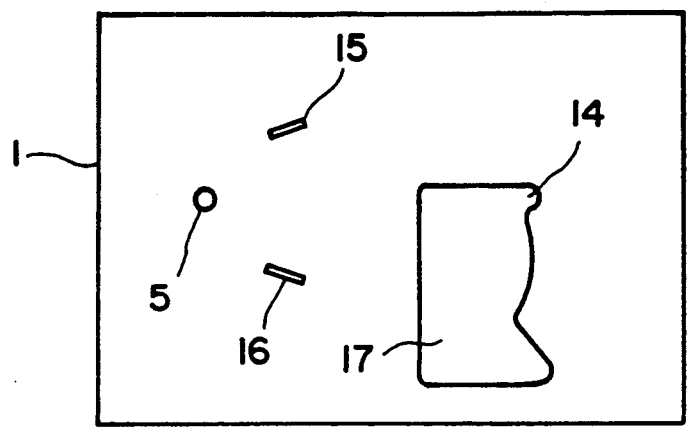
FIG. 6 shows the third embodiment of the apparatus having still another communication opening.
Figure 7:
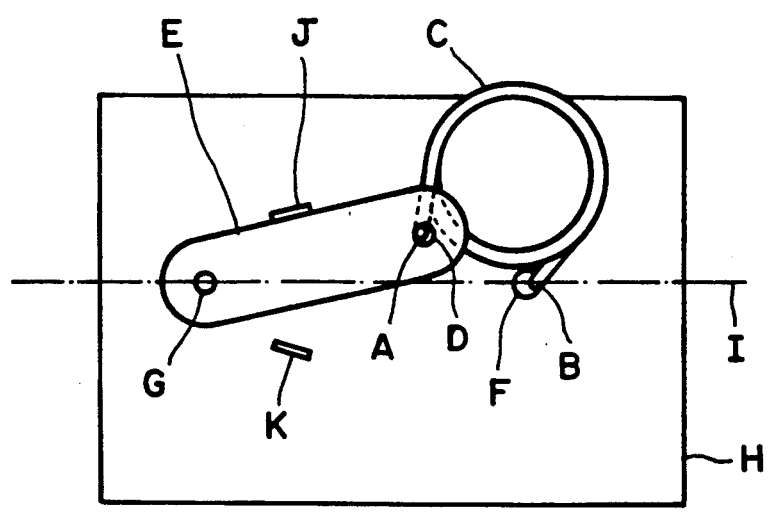
FIG. 7 shows a conventional setting-up apparatus.

In addition, FIG. 6 shows the base plate 1 has a large communication opening 17 provided with notch-shape portions. It is apparent that the shape of the base plate 1 can be employed when the base plate is rigid, resulting in lessening the weight of the base plate.

OPERATION

According to the embodiments shown in FIGS. 1-4, the oscillating member 2 is journalled to the base plate 1 by the shaft 6 and then one leg 12 of the coil spring 11 is engaged with the engagement hole 10 of the oscillating member 2. It is possible to reverse the order of the setting-up operation above.

Figure 4:
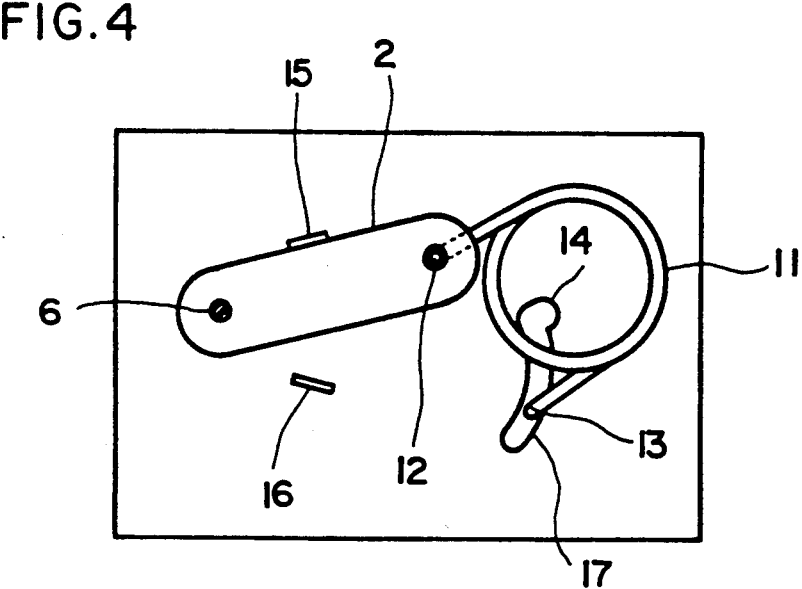
FIG. 4 shows how to set up the coil spring.

Next, as shown in FIG. 4, another leg 13 of the coil spring 11 is inserted or fitted into the communication opening 17 without compression of the coil spring 11. In such situation, no load or no stress is applied to the coil spring, so that the coil spring 11 doesn't spring off if the coil spring is not held by a hand or the like.

Then, another leg 13 or the winding portion of the coil spring 11 is pressed toward a clicking hole or groove 14 of the communication opening 17, guided along the passage wall of the communication opening 17, and fitted into the groove 14 with a click. In this situation, the coil spring 11 is compressed and in its tensed condition, thereby it is difficult that the coil spring comes out of the clicking groove 14.

The embodiment of the base plate 1 shown in FIG. 5 has a straight communication opening 17 extending from the through opening 14 toward the through opening 5. In a setting-up operation of the coil spring 11, the another leg 13 thereof in its no lead condition is inserted into the communication opening 17 at a place considerably near the communication opening 5, and then another leg 13 is adapted to be pushed into the clicking hole or groove 14. Something stronger force is necessary to push another leg 13 of the coil spring 11 into the clicking groove 14 more than that of the previous embodiment, however the setting-up operation of the coil spring 11 is very easy in this embodiment.

According to the embodiment of FIG. 6, the communication opening 17 has a large notch portion, so that the setting-up operation of another leg 13 of the coil spring 11 at a no lead condition into the communication opening 17 is made furthermore easy comparing to these previous embodiments. Then, another leg 13 is pushed toward the clicking groove 14 and the leg 13 is fitted into the groove with a click using a small force similar to that of the first embodiment.

Although the engagement hole 10, the clicking groove 14, and the communication opening 17 are described as through holes, it is possible to employ groove or dent-like shape for them.

When the size of the oscillating member 2 is sufficiently large, it is possible to form the communication opening 17 near the engagement hole 10 of the oscillating member 2 and make them connected to each other.

What is claimed is:

1. A setting-up apparatus of over-centering coil springs comprising;

a base plate having a first opening;

an oscillating member having a second opening and journalled on the base plate so as to be displaced between a first position and a second position;

a coil spring provided with a first leg engaged with said first opening and a second leg engaged with said second opening in order to hold said oscillating member at either one of said first position and the second position separated by a centering dead point of the oscillating member; and a communication opening communicated with said first opening or second opening;

wherein when the first leg or second leg is engaged with either one, which doesn't have the communication opening, of the first opening or second opening, the communication opening is adapted to receive a remaining leg of the coil spring without compression of the coil spring.

* * * * *